United States Patent
Lee et al.

(10) Patent No.: US 10,124,488 B2
(45) Date of Patent: Nov. 13, 2018

(54) ROBOT CONTROL SYSTEM AND METHOD FOR PLANNING DRIVING PATH OF ROBOT

(71) Applicant: Korea Institute of Science and Technology, Seoul (KR)

(72) Inventors: Junghwan Lee, Seoul (KR); Jung Min Park, Seoul (KR); Sang Rok Oh, Gangneung-si (KR)

(73) Assignee: Korea Institute of Science and Technology, Seoul (KR)

( * ) Notice: Subject to any disclaimer, the term of this patent is extended or adjusted under 35 U.S.C. 154(b) by 129 days.

(21) Appl. No.: 15/332,312

(22) Filed: Oct. 24, 2016

(65) Prior Publication Data
US 2017/0120448 A1 May 4, 2017

(30) Foreign Application Priority Data
Oct. 29, 2015 (KR) ........................ 10-2015-0151350

(51) Int. Cl.
*B25J 9/16* (2006.01)
*G05D 1/02* (2006.01)

(52) U.S. Cl.
CPC .......... *B25J 9/1666* (2013.01); *G05D 1/0214* (2013.01); *G05D 2201/0217* (2013.01)

(58) Field of Classification Search
None
See application file for complete search history.

(56) References Cited

U.S. PATENT DOCUMENTS

| | | | |
|---|---|---|---|
| 3,954,428 A | 5/1976 | Marple et al. | |
| 6,879,705 B1 * | 4/2005 | Tao | G06T 7/20 382/103 |
| 9,821,801 B2 * | 11/2017 | Di Cairano | B60W 30/09 |

(Continued)

FOREIGN PATENT DOCUMENTS

| | | |
|---|---|---|
| JP | 2012-190405 A | 10/2012 |
| KR | 10-2011-0015833 A | 2/2011 |

(Continued)

OTHER PUBLICATIONS

Park, J. J., Kim, J. H., & Song, J. B. (2007). Path planning for a robot manipulator based on probabilistic roadmap and reinforcement learning. International Journal of Control, Automation and Systems, 5(6), 674-680. (Year: 2007).*

(Continued)

*Primary Examiner* — Ryan Rink
(74) *Attorney, Agent, or Firm* — NSIP Law

(57) ABSTRACT

A robot control system includes a detecting device configured to detect an obstacle, and a control device configured to control a robot by planning a driving path of the robot. The control device generates a road map space including nodes containing information about a state of the robot and edges connecting the nodes. Also, the control device checks whether the obstacle detected by the detecting device overlaps with the nodes, removes an overlapped node, generates a driving path by sampling remaining nodes and edges, and checks whether the edges of the driving path overlap with the obstacle. When there is no overlapped edge, the control device determines the driving path on the road map space to plan a path along which the robot drives without colliding with the obstacle.

14 Claims, 4 Drawing Sheets

(56) References Cited

U.S. PATENT DOCUMENTS

| | | | |
|---|---|---|---|
| 2011/0035087 A1 | 2/2011 | Kim et al. | |
| 2011/0106307 A1 | 5/2011 | Kim et al. | |
| 2011/0202175 A1* | 8/2011 | Romanov | A47L 11/4011 |
| | | | 700/250 |
| 2012/0165979 A1* | 6/2012 | Lim | B25J 9/162 |
| | | | 700/253 |
| 2014/0121833 A1 | 5/2014 | Lee et al. | |
| 2015/0266182 A1* | 9/2015 | Strandberg | B25J 9/1666 |
| | | | 700/255 |
| 2017/0004406 A1* | 1/2017 | Aghamohammadi | ...... |
| | | | G06N 5/045 |
| 2017/0297455 A1* | 10/2017 | Romanov | B60L 1/003 |
| 2017/0308102 A1* | 10/2017 | Sane | G01C 21/34 |
| 2018/0001472 A1* | 1/2018 | Konidaris | B25J 9/1666 |

FOREIGN PATENT DOCUMENTS

| | | |
|---|---|---|
| KR | 10-2011-0047844 A | 5/2011 |
| KR | 10-2014-0055134 A | 5/2014 |

OTHER PUBLICATIONS

Rimon, Construction of C-space Roadmaps From Local Sensory Data What Should the Sensors Look for?, 1994, IEEE, 117-123 (Year: 1994).*

Robert Bohlin, et al., "A Randomized Approach to Robot Path Planning Based on Lazy Evaluation," *Combinatorial Optimization-Dordrecht-*, vol. 9, No. 1, Jun. 1, 2001, pp. 1-33.

Marcelo Kallmann, et al., "Motion Planning Using Dynamic Roadmaps," Proceedings of the IEEE International Conference on Robotice and Automation (ICRA), Apr. 2004, New Orleans, LA, USA, pp. 4399-4404.

Dave Ferguson, et al., "Replacing with RRTs," *Proceedings of the IEEE International Conference on Robotics and Automation* (ICRA), May 15-19, 2006, (6 pages, in English).

Jur van den Berg, et al., "Anytime Path Planning and Replanning in Dynamic Environments," *Proceedings of the IEEE International Conference on Robotice and Automation* (ICRA), May 2006, pp. 2366-2371.

Junghwan Lee, et al., "PROT: Productive Regions Oriented Task space path planning for hyper-redundant manipulations," *Proceeding of the IEEE International Conference on Robotics & Automation* (ICRA), May 31-Jun. 7, 2014, Hong Kong, China, pp. 6491-6498.

Minsuk Choi, et al., "Implementation of path planning algorithm for humanoid robot-arm using RRT to software platform." ICROS 2010, May 27-28, 2010, pp. 144-146.

* cited by examiner

ROBOT CONTROL SYSTEM AND METHOD FOR PLANNING DRIVING PATH OF ROBOT

CROSS-REFERENCE TO RELATED APPLICATION

This application claims priority to Korean Patent Application No. 2015-0151350, filed on Oct. 29, 2015, and all the benefits accruing therefrom under 35 U.S.C. § 119, the contents of which in its entirety are herein incorporated by reference.

BACKGROUND

1. Field

The present disclosure relates to a robot control system and a method for planning a robot driving path, and more particularly, to a robot control system for planning a driving path of a robot so that the robot does not collide with an obstacle and a method for planning a robot driving path.

2. Description of the Related Art

Recently, in the robot industry fields, various robot technologies are being studied. In particular, a humanoid robot fabricated to have a human-like structure and perform a work like a human is being actively studied and developed.

The humanoid robot includes links and joints for connecting the links and also has a manipulator fabricated by connecting the links and joints to operate substantially similar to arms, hands and legs of a human. The manipulator moves an end-effector to a target point by means of kinetic characteristics of links and joints.

Meanwhile, the motion planning for planning a driving path of a robot finds a path along which the robot may drive from any start point to a designated target point without colliding with an obstacle, in a configuration space where a state of the robot is expressed.

The robot configuration or robot state includes all degree of freedom of the robot such as a location, a shape or the like of the robot. If a base of the manipulator robot is fixed, the entire configuration is defined as an aggregation of angles of all joints. In the planning issue, the target point is generally expressed with a configuration of an end-effector.

Theoretically, a driving path of a robot can be found in the configuration space at every case, but if the degree of freedom of the robot is high, a solution may not be found within a short time.

In this regard, a probability-based random sampling method (Rapidly-exploring Random Tree, RRT) is a stochastic solution method which abandons theoretic completeness and is frequently used for planning a robot driving path since a problem can be solved within a short time.

First, a random robot state is sampled in an entire space and it is checked whether the robot collides with an obstacle in this state. If there is no collision, the state is stored, and connectivity between a newly generated state and a stored state is checked to make a robot state tree structure. As the random sampling process is repeated, the robot state tree is gradually expanded, and if a start point and a target point of a motion planning problem are connected by means of the robot state tree, the process of repeating the sampling is terminated, and a shortest path on the tree is calculated and restored. By doing so, a path having no collision with a given obstacle may be found and utilized for a moving robot and a manipulator robot with more degrees of freedom.

A manipulator robot re-planning method in a variable environment in order to avoid a dynamic obstacle is a sampling-based re-planning method for finding a collision-free path so that an end-effector of a manipulator robot may be moved to a designated target point, in an environment where exact information is not given in advance. In other words, a random sampling-based re-planning (Dynamic RRT, DRRT) in a variable environment performs planning in a variable environment where information of a neighboring obstacle varies due to changes of the environment or uncertainty of a sensor.

When the random sampling-based re-planning is performed in a variable environment, a firstly generated path may become useless due to a newly recognized obstacle. At this time, whenever an existing path becomes useless due to a newly updated obstacle, a random sampling method is performed based on the updated information to generate a new path. When random sampling is performed repeatedly, tree data (for example, a node and an edge) causing collision with the added obstacle may be deleted from the sampling data generated in a previous process by means of validity check, and remaining data may be reused to improve a random sampling rate.

In efficient validity check, the validity of the updated obstacle information and the sampling data may be determined based on whether a robot state corresponding to a node or edge of the robot state tree collides with the presently detected obstacle. It is inefficient to perform validity check for all data whenever the obstacle is updated, and thus sampling data influenced by the updated obstacle may be directly determined by calculating a link function between an obstacle space and a sampling data space. The link function may be constructed by calculating an obstacle space connected whether a node or edge is newly generated during the sampling process.

In the existing technique, the random sampling-based re-planning method is designed for a mobile robot and may be directly applied to a manipulator robot having more degrees of freedom, but this method is not useful since the performance of reusing the sampling data, which is a core technique, is seriously deteriorated.

In addition, in the existing technique, in order to determine reusable sampling data, validity of a node and edge of the robot state tree with respect to the updated obstacle is determined by calculating/using a link function between the obstacle space and the sampling data space. In the existing technique, the link function between the obstacle space and the sampling space is respectively calculated for the node and the edge of the robot state tree.

In this process, particularly when a link function for an edge of the state tree is calculated, very long time is taken for the calculation if the manipulator robot has more degrees of freedom and higher complexity. If the manipulator robot has more degrees of freedom and higher complexity, a space (swept volume) swept by the robot is enlarged just with a small motion, and thus very long time is taken to calculate the link function between the edge of the sampling space and the obstacle space. In addition, since the probability that the edge is not effective with respect to any obstacle increases, the efficiency for the validity check for the edge is seriously deteriorated.

Meanwhile, in case of the manipulator robot, a configuration for moving an end-effector to a target point cannot be defined uniquely, and thus a goal biasing method for improving the performance may not be directly applied when the random sampling is performed.

Meanwhile, a root of the state tree continuously varies due to the repeated random sampling works and the movement of the robot during the overall re-planning process, and the nodes and edges reused are configured based on a previous root. For this reason, the configuration of the robot state tree becomes gradually unbalanced.

An unbalanced tree structure enhances the risk of increasing the number of lower data which are removed together when a node or edge at a higher rank is removed, due to a new obstacle which may occur later, and thus enhances the possibility of elongating a final robot driving path further.

SUMMARY

The present disclosure is directed to providing a method for planning a robot driving path and a robot control system, which may reduce time required for calculating a link function between spaces when applying a random sampling-based re-planning method, by firstly checking whether an obstacle is overlapped with a node and then checking whether the obstacle is overlapped with an edge after a driving path is generated.

In one aspect of the present disclosure, there is provided a method for planning a robot driving path, which plans a driving path of a robot so that the robot does not collide with an obstacle, wherein the driving path is planned on a road map space which includes nodes and edges connecting the nodes and defines a driving state of the robot, the method comprising: detecting an obstacle; checking whether the nodes overlap with the obstacle; removing a node overlapping with the obstacle; generating a driving path by sampling remaining nodes and edges; checking whether edges of the driving path overlap with the obstacle; and determining the driving path on the road map space when no edge overlaps with the obstacle.

According to an embodiment of the present disclosure, the method may further include: when there is an edge overlapping with the obstacle among the edges of the driving path, removing the overlapped edge; and generating a new driving path by sampling the remaining nodes and edges.

According to an embodiment of the present disclosure, the robot may be a manipulator robot having one or more joint.

According to an embodiment of the present disclosure, the nodes may define a location of the robot and a posture of a joint of the robot.

According to an embodiment of the present disclosure, the driving path may be planned in a robot state tree including a part of nodes and edges extracted from the road map space.

According to an embodiment of the present disclosure, an interval between the nodes included in the robot state tree may be adjusted to be smaller than a minimal size of the detected obstacle.

According to an embodiment of the present disclosure, the road map space may be interconvertable with a working space in which the robot actually drives, by means of an inverse kinematics calculation method, and the driving path may be generated by directly connecting a start point and a target point of an end-effector of the robot on the working space.

According to an embodiment of the present disclosure, the method may further include: before removing the overlapped edge, generating edges connecting a present node corresponding to a present state of the robot to nodes adjacent to the present node on the road map space.

According to an embodiment of the present disclosure, the method may further include: before generating a new driving path, detecting movement of the obstacle and generating new node and edge in an area where the obstacle disappears.

According to an embodiment of the present disclosure, the method may further include: before generating a new driving path, removing a node and edge directly or indirectly not connected to a present node corresponding to a present state of the robot, among the remaining nodes and edges.

In another aspect of the present disclosure, there is provided a robot control system, comprising: a detecting device configured to detect an obstacle; and a control device configured to control a robot by planning a driving path of the robot, wherein the control device generates a road map space including nodes containing information about a state of the robot and edges connecting the nodes, checks whether the obstacle detected by the detecting device overlaps with the nodes, removes an overlapped node, generates a driving path by sampling remaining nodes and edges, checks whether the edges of the driving path overlap with the obstacle, and, when there is no overlapped edge, determines the driving path on the road map space to plan a path along which the robot drives without colliding with the obstacle.

According to an embodiment of the present disclosure, the robot control system may further include a driving device controlled by the control device to drive the robot along the determined driving path.

According to an embodiment of the present disclosure, the control device may indirectly detect an obstacle based on changes of a driving state of the driving device.

According to an embodiment of the present disclosure, the detecting device may periodically detect an obstacle while the robot is driving, and the control device may drive the robot along the determined driving path and periodically check whether the nodes and edges of the determined driving path overlap with the obstacle.

DETAILED DESCRIPTION

Hereinafter, a robot control system according to an embodiment of the present disclosure will be described with reference to the accompanying drawings.

Figure 1:
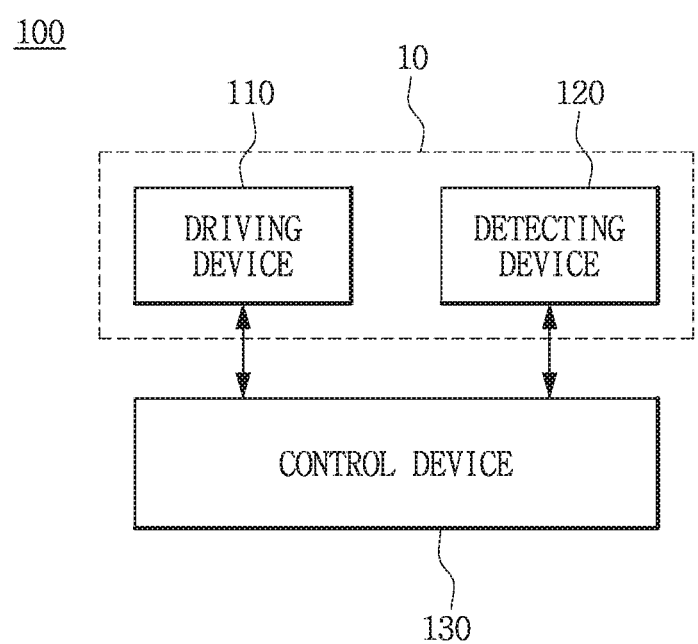
FIG. 1 is a schematic diagram showing a robot control system according to an embodiment of the present disclosure.

Referring to FIG. 1, a robot control system 100 according to an embodiment of the present disclosure includes a driving device 110, a detecting device 120 and a control device 130.

The driving device 110 drives a robot 10 or each component of the robot 10. The driving device 110 may rotate wheels of the robot 10 or turns joints of the robot 10 by using a motor or a pneumatic cylinder.

The driving device 110 is controlled by the control device 130. Movement of the robot 10, a turning angle of each joint or the like may be controlled by means of control information transmitted from the control device 130. For example, if the driving information calculated by the control device 130 is input to the driving device 110, it is possible to determine a posture of the robot 10 including a moving distance and direction of the robot 10 and angles of joints of the robot 10. The driving device 110 drives the robot 10 so that the robot 10 may accomplish a single determined posture.

The information about a driving state of the driving device 110 may also be transmitted to the control device 130. Based on this information, the control device 130 may check a driving state of the robot 10. In addition, the control device 130 may indirectly figure out a geographic feature of a working space based on changes of the driving state of the driving device 110. For example, a geographic feature may be figured out based on changes of the driving state of the driving device 110 which are generated when the robot 10 does not drive due to an obstacle or moves up or down on the incline.

Meanwhile, in this embodiment, the robot 10 is illustrated as a mobile robot which is movable on a working space, but the robot 10 may also be a robot whose base is fixed while its body is rotatable or its manipulator is movable.

The detecting device 120 detects a working space surrounding the robot 10. The detecting device 120 may detect geographical features such as a height of the working space and detect an obstacle located on the working space. For example, the detecting device 120 may include an ultrasonic sensor or an optical sensor.

In addition, the detecting device 120 may detect changes of the working space. The detecting device 120 may detect geographical changes along with time, or generation, movement and extinction of an obstacle.

The detecting device 120 may transmit the information about the working space to the control device 130. Based on the distance and direction information of each geographic feature on the working space transmitted from the detecting device 120, the control device 130 may figure out a location relation of each detected component of the working space.

Meanwhile, the detecting device 120 may be controlled by the control device 130. The control device 130 may control the detecting device 120 by transmitting information about a range and direction of a working space to be detected to the detecting device 120.

The control device 130 generates information about driving of the robot 10 based on the information of the working space figured out by the detecting device 120. In addition, the control device 130 may drive the robot 10 by transmitting the generated driving information to the driving device 110.

The control device 130 may generate a road map space serving as a configuration space which defines the driving state of the robot 10. The nodes respectively forming points of the road map space define different postures of the robot 10. One node may include a location of the robot 10 on the working space where the robot 10 actually drives, a base, a joint and a link of the robot 10, and a location and angle of an end-effector. One node defines a single posture of the robot 10. Therefore, the road map space may be three-dimensional in case of a simply moving robot but may also be higher than the three dimensions in case of a manipulator robot.

The road map space may include an edge connecting two nodes. The edge may be composed of numerous nodes. The edge includes successive changes of a posture of the robot 10. For example, a path from one end of the edge to the other end thereof defines a series of linked postures for driving the robot 10 from one posture to another posture.

The control device 130 may extract a part of nodes from the road map space at random. The nodes may be extracted in consideration of the size of the working space. In addition, if an interval between nodes is great, even though an obstacle exists, there may be no node overlapping with the obstacle and thus a path for avoiding the obstacle may not be generated. Therefore, the nodes may be extracted to have a suitable interval in consideration of a minimal size of the obstacle.

The nodes extracted from the road map space at random may be connected by means of an edge. Every two nodes may be connected using a single edge, but for the convenience in calculation, some edges may be omitted. An edge may also be generated based on a present node corresponding to a present state of the robot. Nodes in a certain range may be connected to the present node, and the other nodes may also be connected to the nodes within the certain range.

In this way, the control device 130 may generate a robot state tree by extracting some nodes and edges in the road map space. The control device 130 plans a driving path of the robot by using the generated robot state tree, and thus the driving path planning efficiency may be enhanced in comparison to a case where a driving path is directly planned using all nodes and edges.

The control device 130 checks whether the nodes overlap with an obstacle. The control device 130 may check whether a node on the road map space overlaps with an obstacle on the working space, by using a link function. By doing so, it is possible to figure out whether the robot 10 on the working space having a posture corresponding to the node collides with the obstacle or not.

In addition, the control device 130 checks whether the edges overlap with an obstacle. It is possible to check whether the robot 10 collides with the obstacle by comparing a region of the working space whether the robot 10 passes according to the edge with the obstacle. At this time, all edges may be checked simultaneously, but some nodes configuring the edges may be extracted and checked to enhance the checking efficiency.

The control device 130 adds or removes a node or edge of the robot state tree to/from robot state tree. The control device 130 removes a node or edge checked as being overlapping with the obstacle. In addition, an edge which connects the present node corresponding to a present state of the robot on the road map space to nodes adjacent to the present node may be newly generated. In addition, new node and edge may also be generated in a region where an existing obstacle has existed but now disappears. Moreover, node and edge directly or indirectly not connected to the present node corresponding to a present robot state may be removed from remaining nodes and edges in order to reduce unnecessary calculation.

Meanwhile, the control device 130 generates a driving path on the road map space by sampling the nodes and the edges. The driving path may be composed of a part of nodes and edges so that the present node is successively connected to any target node. Any driving connecting one region on the path road map space to another region thereof may be generated. A plurality of driving paths connecting regions may be generated. The control device 130 may generate a plurality of driving paths simultaneously, and may also perform validity check for each driving path based thereon.

If the nodes and edges of the generated driving path do not overlap with the obstacle, the control device 130 determines the driving path on the generated road map space. By determining whether the robot overlaps with the obstacle by using the driving path generated with the sampled nodes and edges, the time required for determining an effective driving path may be shortened.

Meanwhile, the control device 130 may interconvert the road map space and the working space into each other by means of an inverse kinematics calculation method. At this time, the driving path of the robot 10 displayed on the working space may be expressed as a location of an end-effector of the robot 10. As described above, since a start point and a target point of the end-effector are directly connected just with the location of the end-effector of the robot 10 on the working space which is relatively simpler than the road map space, the driving path may be generated in a simpler way. The driving path directly generated on the working space may be converted again on the road map space to generate one or more driving path composed of nodes and edges. A process of generating a driving path by interconverting the road map space and the working space will be described later in more detail.

The control device 130 may store and modify information about the robot state tree, the nodes, the edges and the obstacle on the road map space as described above. For example, the control device 130 may update robot state tree at regular time intervals based on initially input information stored therein, modify some of the stored information and store the modified information again. By reusing the stored information, the time required for determining a driving path may be shortened in comparison to a case where the entire information is newly generated all the time.

Meanwhile, the control device 130 may be included in the robot 10 or located out of the robot 10 to make wired/wireless communication with the robot 10 in order to control the robot 10. In other words, the control device 130 may transmit and receive information about the obstacle and surrounding geographic features with the detecting device 120 disposed at the robot 10. In addition, the control device 130 may transmit or receive an input signal for driving the robot 10 based on the determined driving path with the driving device 110 disposed at the robot 10.

Hereinafter, a method for planning a driving path of the robot 10 by using the robot control system 100 described above so that the robot 10 drives without colliding with an obstacle will be described.

Figure 2:
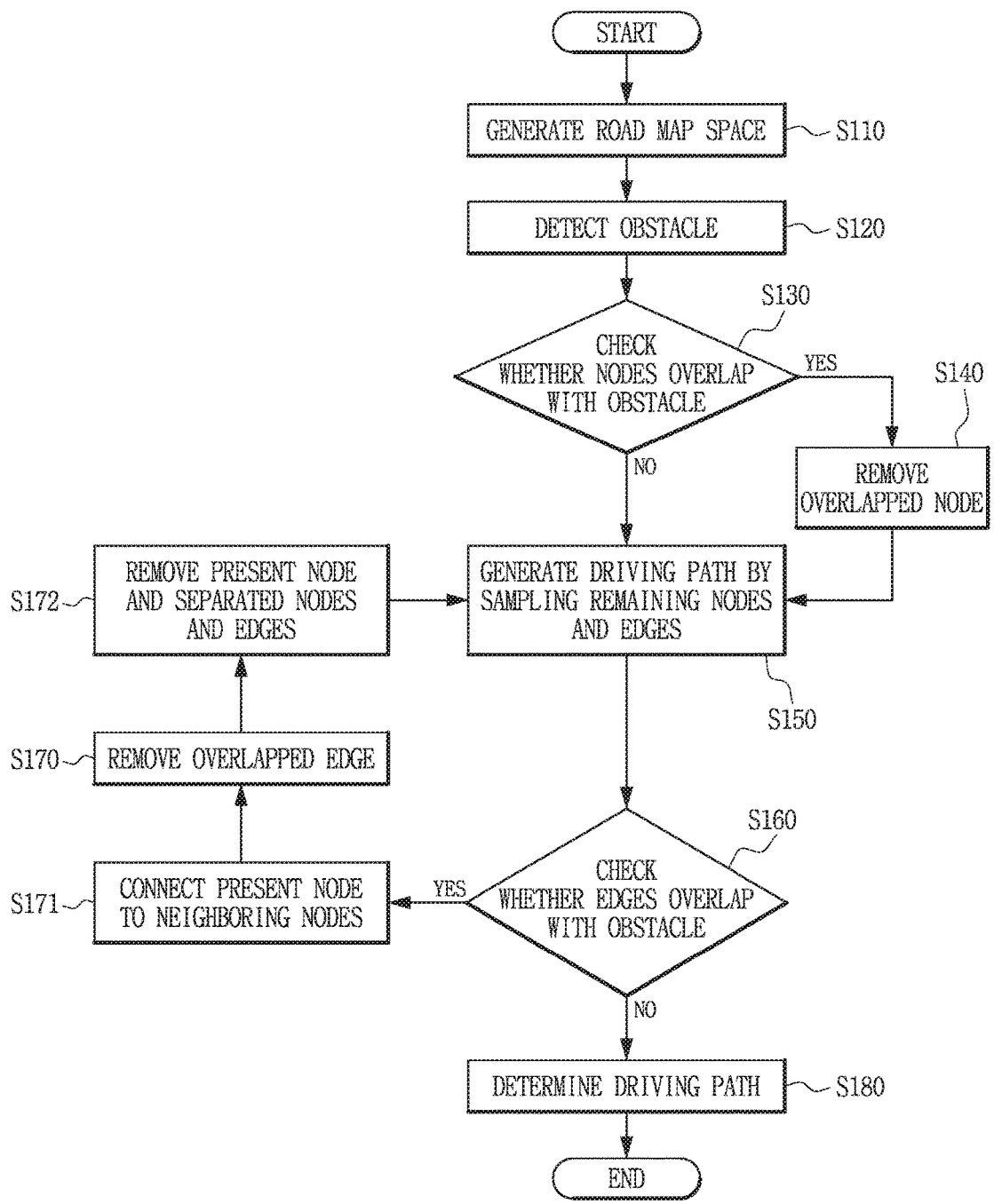
FIG. 2 is a flowchart for illustrating each step of a method for planning a robot driving path according to another embodiment of the present disclosure.

Referring to FIG. 2, the method for planning a robot driving path according to an embodiment of the present disclosure includes: generating a road map space (S110), detecting an obstacle (S120), checking whether nodes overlap with the obstacle (S130), removing an overlapped node (S140), generating a driving path by sampling remaining nodes and edges (S150), checking whether edges overlap with the obstacle (S160), and determining a driving path (S180).

First, a road map space is generated (S110). The road map space determines a location of the robot on the working space and a posture of the robot. In other words, the road map space shows a state of the robot driving with a certain posture at a certain location on the working space.

In S110, a robot state tree including nodes extracted from a part of points of the road map space and edges connecting the extracted nodes may be generated. An interval between the nodes may be set in consideration of volumes of the obstacle and the robot. In other words, when an obstacle is detected, an interval between the nodes may be set smaller than a minimal size of the obstacle so that one or more nodes overlap with the obstacle.

The edge may be extracted to connect nodes located within a predetermined distance from a present node, which represents a present state of the robot, to the present node, and also to connect other nodes located within a predetermined distance from the connected node subsequently. In other case, the edge may be set so that the edge is connected only between nodes spaced apart from the connected node by a predetermined distance or less.

As described above, by expressing information about a posture of the robot on the single road map space, the robot may be more easily controlled to drive and relevant calculations may be performed more easily. In addition, by extracting nodes and edges as a part of the road map space, following calculations in relation to the driving path may be simplified.

Next, an obstacle on the working space is detected (S120). S120 may include an operation for detecting locations of the working space and the obstacle in real time. By doing so, it is possible to figure out changes of the working space, movement of the obstacle or the like.

In S120, if an obstacle is detected by the detecting device 120, information about the location of the obstacle on the working space is transmitted to the control device 130. Based on the transmitted information, a current state of the geographic feature on the working space may be compared with a previous state.

Next, it is checked whether the nodes overlap with the obstacle (S130). In S130, it may be checked whether the robot having a posture according to the nodes collides with the obstacle.

Whether the nodes on the road map space overlap with the obstacle on the working space may be checked by means of a link function as follows.

$$\phi_n(c) = \{x \in T_n | V(x) \cap c \neq \theta\} \quad \text{Equation 1}$$

C represents a classified region on the working space, V(X) represents a volume of the working space occupied by the robot having a posture of X, and $T_n$ represents nodes on the robot state tree.

Next, if there is a node overlapping with the obstacle in S130, the overlapped node is removed (S140). Among the nodes on the robot state tree, a node overlapping with the obstacle is firstly removed, and the edge remains as it is.

Meanwhile, a new node and edge may be generated in a region where a new node and edge has not been generated due to the presence of an existing obstacle or in a region where a node and edge has been deleted. Due to such variable environments where an obstacle appears, moves and disappears, the robot state tree on the road map space may be successively updated by adding or deleting a node and edge to/from the robot state tree.

Next, a driving path is generated by sampling remaining nodes and edges (S150). If there is an overlapping node in S130, the overlapping node is removed (S140), and then a driving path is generated using remaining nodes and edges. If there is no overlapping node in S130, a driving path is generated using all nodes and edges.

The driving path may be generated by sampling a part of nodes and edges by means of a probability-based random sampling method. A certain driving path connecting nodes within a target area of a certain range may be generated from present nodes on the road map space. In addition, it is also possible to select a shortest driving path among available driving paths.

Meanwhile, a driving path may be generated by interconverting the road map space and the working space to each other. The driving path on the road map space may be simplified into a location moving path of an end-effector of the robot on the working space.

The location moving path of the end-effector may be obtained by means of an inverse kinematics calculation method. The location moving path of the end-effector may be directly generated by connecting a target point of the end-effector, aimed on the converted working space, to a start point at which the end-effector is presently located. A location moving path detouring to avoid an obstacle is generated in consideration of the obstacle on the working space. A location moving path may be generated as a shortest path between the start point and the target point. A driving path is generated on the road map space by inversely converting the location moving path of the end-effector, obtained on the working space, onto the road map space again.

As described above, an effective path is generated on the working space which ensures relatively simpler calculation, by means of interconversion between the road map space and the working space, and converted again so that a goal biasing method as described above may be used even though a manipulator robot may have a plurality of postures with respect to a single location.

Next, it is checked whether the edges of the driving path generated in S150 overlap with the obstacle (S160). Through the S160, it is possible to check whether a swept volume swept by the robot along the edges overlaps with the obstacle.

Whether the edges on the road map space overlap with the obstacle on the working space may be checked by means of a link function as follows.

$$\phi_e(c) = \{\gamma \in T_e | V(\gamma) \cap c \neq \emptyset\} \qquad \text{Equation 2}$$

C represents a classified region on the working space, $V(\gamma)$ represents a volume on the working space swept by the robot along an edge $\gamma$, and $T_e$ represents edges on the robot state tree.

Meanwhile, it is also possible to check whether the edges overlap with the obstacle just by inspecting only some nodes of the edges. For example, it is possible to check whether the edges overlap with the obstacle by inspecting a node located between the edges and also inspecting a node located in the middle of regions. In other case, it is also possible to inspect some nodes having a predetermined interval in consideration of the size of the obstacle.

As described above, when validity check is performed to nodes and edges, in the present disclosure, only nodes may be checked first (S130), and it is postponed to check edges (S160), but only edges on the driving path generated by sampling may be checked, thereby reducing the time required for performing validity check to edges, which consumes a lot of time. In other words, when a driving path of the robot is generated, validity check is performed to the edges included in the driving path, instead of the postponed edge checking at the previous validity check.

Even though the frequency of sampling for finally determining an effective driving path increases in comparison to an existing robot driving path planning method, the amount of calculation for a swept volume with respect to edges is greatly reduced, thereby improving the overall performance. In particular, since the amount of calculation for a swept volume with respect to edges, which consumes a lot of time for the manipulator robot, is greatly reduced, the overall planning performance may be improved.

Next, if any edge overlaps with the obstacle among the edges of the driving path in S160, the overlapped edge is removed (S170).

Figure 3A:
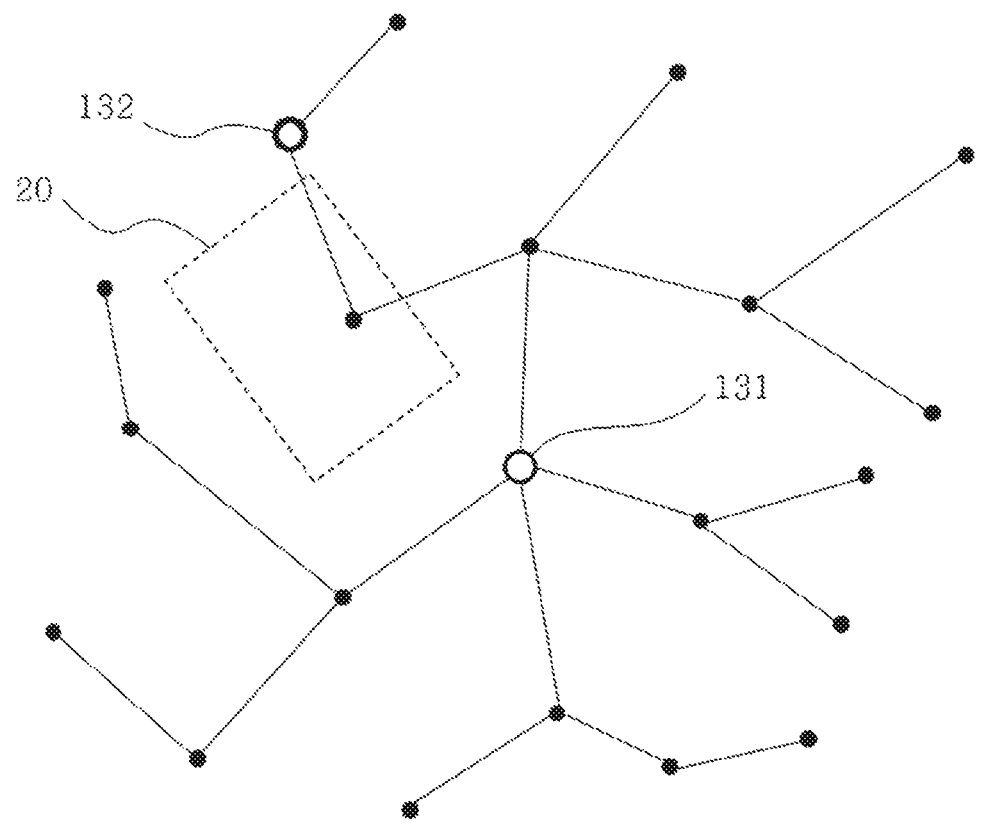
FIGS. 3A and 3B are schematic diagrams showing nodes and edges disposed on a road map space.
Figure 3B:
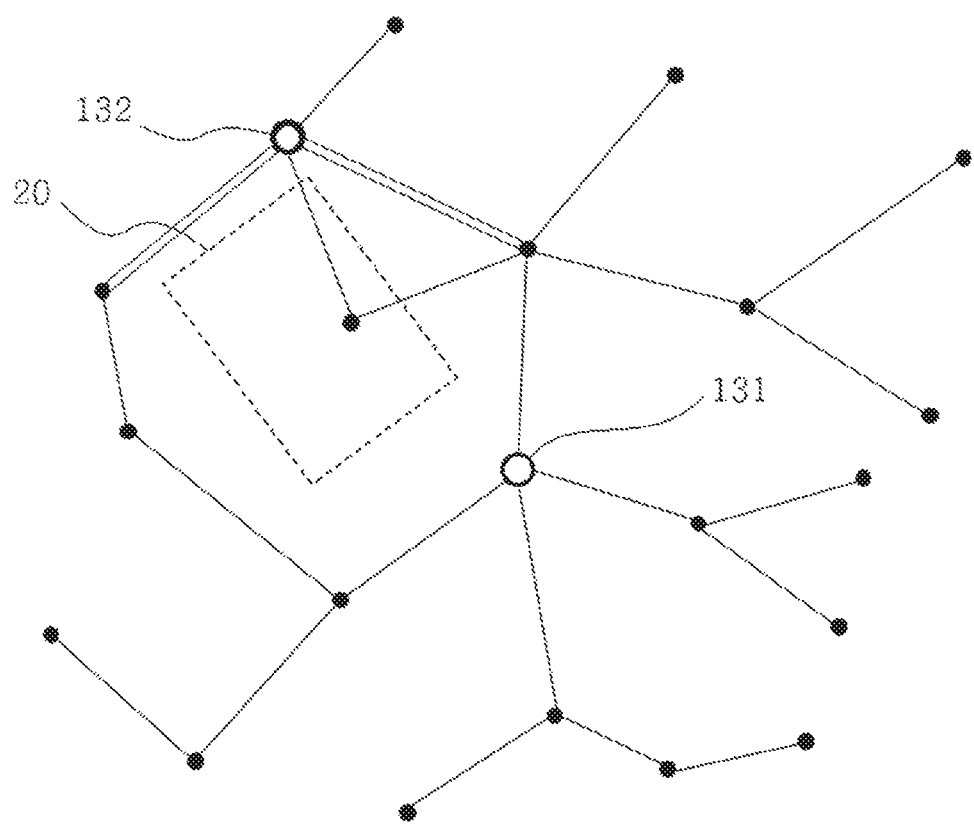

Meanwhile, referring to FIGS. 3A and 3B, before removing the overlapped edge (S170), a step of generating an edge connecting the present node 132 corresponding to a present robot state on the road map space to nodes adjacent to the present node 132 (S171) may be further included.

Since the robot is driven with the present node at the existing node 131, the entire edges included in the robot state tree may be unbalanced. At this time, if edges overlapping with the obstacle 20 are removed as shown in the figures, a broad region of the robot state tree connected to the existing node 131 may be removed together.

Therefore, as indicated by double lines in FIG. 3B, an edge connecting the present node 132 to nodes spaced apart from the present node 132 by a predetermined distance may be generated to prevent an extensive loss of the existing state tree. At this time, if an edge is generated in too small area, it may not be possible to prevent a loss of the state tree, and if an edge is generated in too large area, edges may be unnecessarily increased to deteriorate the performance. Thus, a reference distance for generating edges should be selected appropriately in consideration of the above.

Meanwhile, before newly generating a driving path (S150), a step of removing nodes and edges directly or indirectly not connected to the present node corresponding to a present robot state from the remaining nodes and edges but separated therefrom (S172) may be further included. Since edges overlapping with the obstacle are removed, nodes and edges independently separated from the robot state tree may be removed, and thus it is possible to reduce unnecessary sampling or unnecessary overlap checking.

Next, the remaining nodes and edges are sampled to generate a new driving path (S150).

As shown in the figures, it is repeated to generate a driving path and perform validity check to edges on the driving path, until an effective driving path is found. Meanwhile, after this process is repeated until a predetermined cut-off time, the robot may be driven according to a final driving path regardless of whether the driving path is confirmatively determined.

If there is no edge overlapping with the obstacle, the driving path is confirmatively determined on the road map space (S180). According to the determined driving path, the robot is controlled to drive with a given posture to a given location on the working space.

Meanwhile, as the robot is driven along the determined driving path, the method for planning a robot driving path as described above may be periodically repeated. Since the information about the obstacle and the working space detected at an initial state may be different from the information about the obstacle and the working space which may vary due to the movement of the robot, it is desirable to check validity of the driving path at predetermined time intervals.

First, an obstacle is detected periodically to check whether a new obstacle appears or an existing obstacle moves or disappears.

The location of the obstacle on the working space, detected by the detecting device 120, is compared with the location of the obstacle in consideration of the movement of the robot. If the location of the obstacle before the movement is different from the location of the obstacle after the movement, the operations according to the method for planning a robot driving path as described above are performed to determine a new driving path.

Meanwhile, new node and edge may be generated at a location where a node or edge is not generated due to an existing obstacle or removed and then an obstacle disappears later. In addition, an edge connecting the present node to neighboring nodes may be generated (S171), and nodes and edges separated from the present node may be removed.

The embodiments of the present disclosure have been described in detail with reference to the accompanying drawings, but the present disclosure is not limited to the embodiments but may be modified in various ways without departing from the scope of the present disclosure. Therefore, the embodiments in the present disclosure are not intended to limit the scope of the present disclosure but intended for illustration, and the scope of the present disclosure is not limited to the embodiments. Therefore, the embodiments described above should be understood as being illustrative in all aspects, rather than restrictive. The scope of the present disclosure to be protected should be interpreted based on the appended claims, and all equivalents thereof should be understood as falling within the scope of the present disclosure.

What is claimed is:

1. A method for planning a driving path for a robot, the method comprising:
 detecting an obstacle;
 checking, prior to generation of a driving path, whether nodes overlap with the obstacle;
 removing one of the nodes overlapping with the obstacle;
 generating the driving path by sampling edges and remaining nodes excluding the removed one of the nodes;
 checking whether edges of the generated driving path overlap with the obstacle; and
 determining the driving path on a road map space in response to no edge overlaps overlapping with the obstacle,
 wherein the road map space defines a driving state of the robot.

2. The method of claim 1, further comprising:
 removing one of the edges of the generated driving path in response to the one of the edges overlapping with the obstacle; and
 generating a new driving path by sampling the remaining nodes and remaining edges excluding the removed one of the edges.

3. The method of claim 1,
 wherein the robot is a manipulator robot having one or more joints.

4. The method of claim 3,
 wherein the nodes define a location of the robot and a posture of a joint of the one or more joints.

5. The method of claim 1,
 wherein the driving path is planned in a robot state tree including a part of nodes and edges extracted from the road map space.

6. The method of claim 5,
 wherein an interval between the nodes included in the robot state tree is adjusted to be smaller than a minimal size of the detected obstacle.

7. The method of claim 3,
 wherein the road map space is interconvertible with a working space in which the robot actually drives, by means of an inverse kinematics calculation method, and
 wherein the driving path is generated by directly connecting a start point and a target point of an end-effector of the robot on the working space.

8. The method of claim 2, further comprising:
 before removing one of the edges, generating edges of the driving path connecting a present node corresponding to a present state of the robot to nodes adjacent to the present node on the road map space.

9. The method of claim 2, further comprising:
 before generating a new driving path, detecting movement of the obstacle and generating a new node and a new edge in an area where the obstacle is no longer located.

10. The method of claim 2, further comprising:
 before generating a new driving path, removing a node and an edge that are neither directly nor indirectly connected to a present node corresponding to a present state of the robot, among the remaining nodes and the remaining edges.

11. A control system for a robot, comprising:
 a detector configured to detect an obstacle; and
 a controller configured to:
  control a robot by planning a driving path of the robot,
  generate a road map space including nodes containing information about a state of the robot and edges connecting the nodes,
  check, prior to generation of a driving path, whether the nodes overlap with the obstacle detected by the detecting device,
  remove an overlapped node of the nodes,
  generate the driving path by sampling edges and remaining nodes excluding the removed overlapped node,
  check whether the edges of the generated driving path overlap with the obstacle, and
  determine, in response to there being no overlapped edge, the driving path on the road map space to plan a path along which the robot is to drive without colliding with the obstacle.

12. The robot control system according to claim 11, further comprising:
 a driver controlled by the controller to drive the robot along the determined driving path.

13. The robot control system according to claim 12,
 wherein the controller is configured to indirectly detect an obstacle based on changes of a driving state of the driver.

14. The robot control system according to claim 11,
 wherein the detector is configured to periodically detect the obstacle while the robot is driving, and
 wherein the controller is configured to:
  control the driver to drive the robot along the determined driving path, and
  periodically check whether the nodes and edges of the determined driving path overlap with the obstacle.

* * * * *